United States Patent [19]

Magnuson

[11] Patent Number: 4,664,148
[45] Date of Patent: May 12, 1987

[54] QUICK DISCONNECT COUPLING WITH A LOCKABLE VALVE ACTUATOR

[75] Inventor: Ruel D. Magnuson, Eagle, Nebr.

[73] Assignee: Clevite Industries Inc., Glenview, Ill.

[21] Appl. No.: 825,256

[22] Filed: Feb. 3, 1986

[51] Int. Cl.[4] .............................. F16L 37/28
[52] U.S. Cl. ..................... 137/614.05; 137/614.06
[58] Field of Search ............... 137/614.03, 614.04, 137/614.05, 614.06; 251/149.9

[56] References Cited

U.S. PATENT DOCUMENTS

| 3,791,411 | 2/1974 | Bogeshov et al. | 251/149.6 X |
| 4,098,292 | 7/1978 | Evans | 137/614.04 |
| 4,150,691 | 4/1979 | Moldavs | 137/614.03 |
| 4,398,561 | 8/1983 | Moldavs | 137/614.05 |

Primary Examiner—A. Michael Chambers
Assistant Examiner—John C. Fox
Attorney, Agent, or Firm—Russell E. Baumann

[57] ABSTRACT

A quick disconnect female coupling includes an actuator which is engageable with the valve of a male coupling and a lock for maintaining the actuator in position to hold the valve of the male coupling open when the male and female couplings are connecting.

9 Claims, 5 Drawing Figures

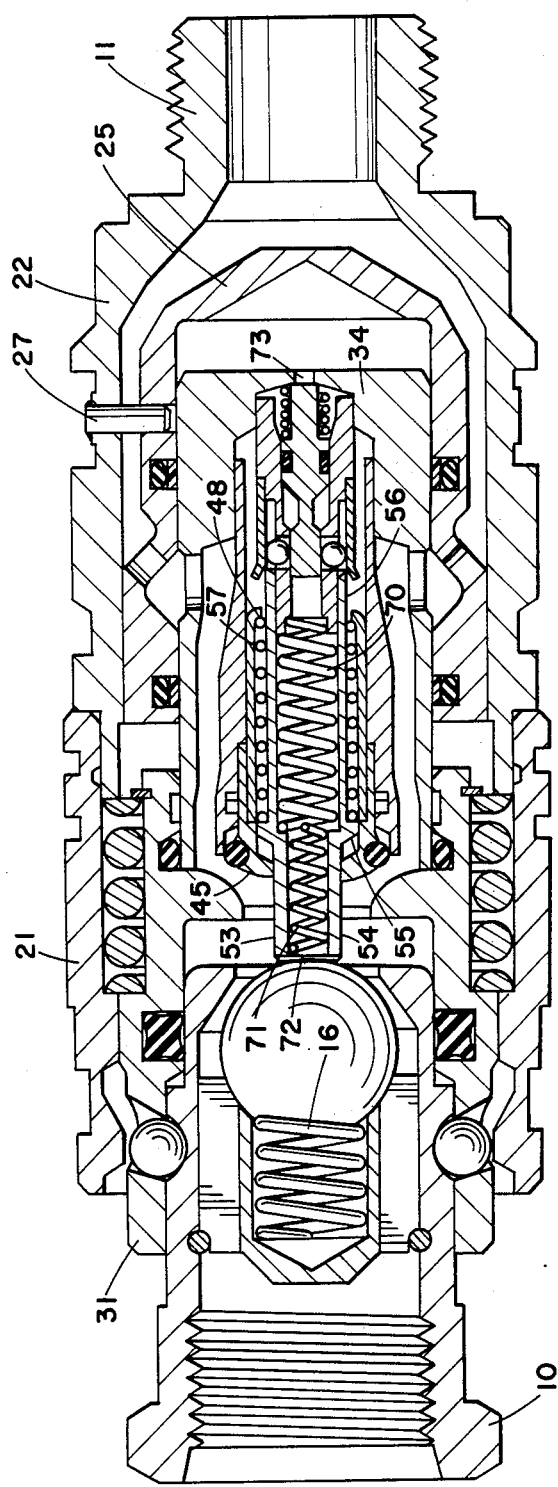
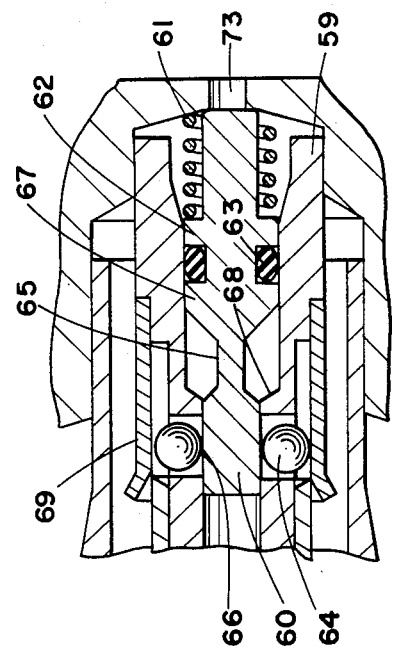
FIG. 4
FIG. 5

QUICK DISCONNECT COUPLING WITH A LOCKABLE VALVE ACTUATOR

BACKGROUND

This invention relates to a quick disconnect coupling, and, more particularly, to a quick disconnect coupling with a valve actuator which can be locked in an actuating position.

Quick disconnect couplings are used for connecting and disconnecting hydraulic hoses. For example, an agricultural tractor conventionally has a coupling for connecting a hydraulic power source on the tractor to a hydraulically operated implement. The female half of the coupling is mounted on the tractor, and the male half of the coupling is mounted on the implement hose.

U.S. Pat. Nos. 4,444,223 and 4,221,235 describe quick disconnect couplings which are designed for connecting when both the female and male couplings are pressurized. The valves of both couplings are held in their open positions by springs. However, under a high surge flow condition in the male-to-female direction, the hydraulic flow force can overcome the spring force and close the male valve.

SUMMARY OF THE INVENTION

The invention provides an actuator which can be locked to hold the male valve in the open position. The lock is actuated by fluid pressure within the coupling so that the lock is actuated automatically when the valves are opened. When the coupling is disconnected the lock is released.

DESCRIPTION OF THE DRAWING

The invention will be explained in conjunction with an illustrative embodiment shown in the accompanying drawing, in which--

FIG. 4 illustrates the male and female couplings after hydraulic pressure is supplied to the female coupling to open the valve in the male coupling; and FIG. 5 is an enlarged illustration of the locking mechanism of the present invention.

DESCRIPTION OF SPECIFIC EMBODIMENT

U.S. Pat. No. 4,221,235 describes a female coupling which includes an outer locking sleeve which is slidably mounted on a housing for locking and unlocking the male coupling. U.S. Pat. No. 4,444,223 describes a female coupling which does not have exterior moving parts. Rather, a tubular fitting slides within a housing for locking and unlocking the male coupling. The invention can be used with either type of coupling. However, for purposes of illustration the invention will be described with respect to the latter type of coupling.

Figure 1:
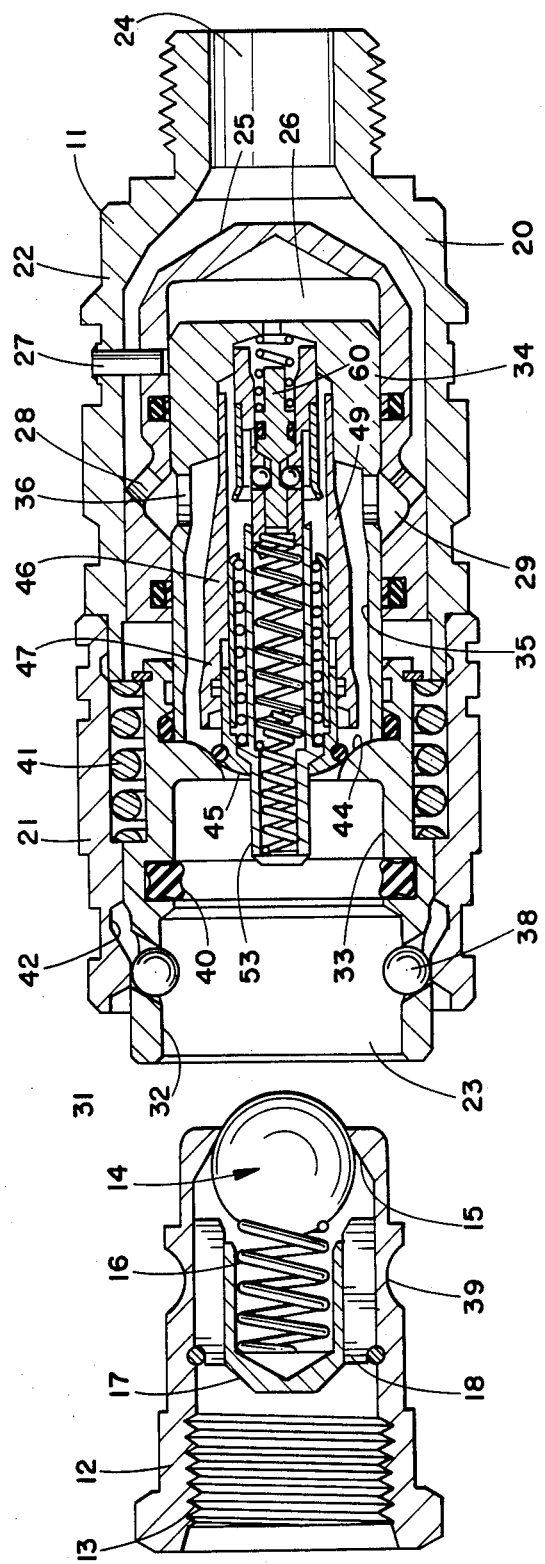
FIG. 1 is an elevational sectional view showing a male coupling and a female coupling disconnected.

Referring to FIG. 1, a quick connect and disconnect coupling includes a male coupling 10 and a female coupling 11. The male coupling includes an outer tubular housing 12 having an internal bore 13 and a ball 14 which acts as a check valve. The ball is biased against a valve seat 15 on the housing by a spring 16 which is mounted within a tubular guide 17. The guide is mounted within the housing by a spider support 18.

The female coupling includes an outer tubular housing 20 which includes a front half 21 and a rear half 22 which are screwed together. The front outer housing 21 has an open forward end 23, and the rear outer housing 22 has a rear opening 24 which can be connected to a source of pressurized hydraulic fluid.

A stationary inner cup-shaped housing 25 is mounted within the rear outer housing 22 and has an internal cavity 26 which is connected to the exterior of the coupling by one or more tubes 27 which extend through the rear outer housing 22. A plurality of ports 28 communicate the interior of the stationary inner housing 25 with the internal bore 29 of the rear outer housing 22.

A slidable inner tubular housing 31 is slidably mounted within the front outer housing 21 and has an open forward end 32 and an internal bore 33. A cup-shaped inner housing 34 is connected to the slidable inner housing 31 and is slidable within the stationary inner housing 25. The inner housing 34 is provided with an internal bore 35 which communicates with the bore 29 of the inner stationary housing 25 through ports 36.

Figure 2:
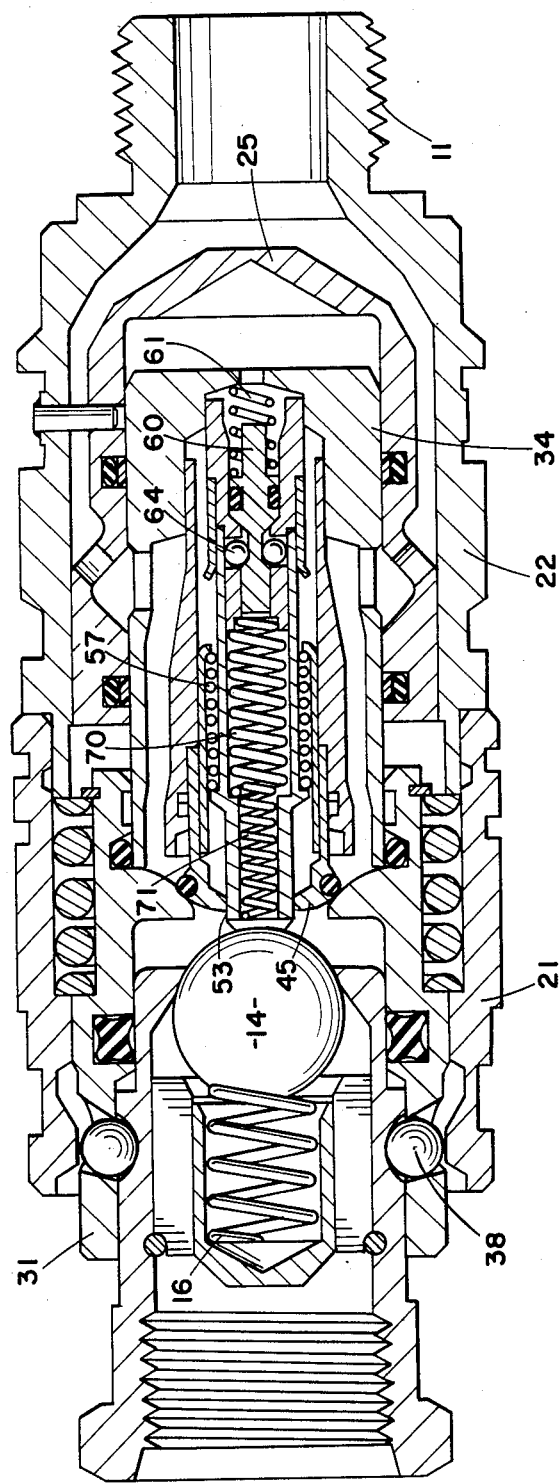
FIG. 2 shows the male and female couplings connected, the valve of each coupling being maintained in a closed position by fluid pressure within the coupling.

The slidable inner housing 31 carries a plurality of locking balls 38 which are engageable with a groove 39 in the male coupling in order to lock the couplings together as shown in FIG. 2. A gasket 40 on the inner housing 31 provides a fluid-tight seal between the connected couplings. The inner housing 31 is slidable rearwardly against the bias of the spring 41 to permit the locking balls to move outwardly into a recess 42 in the outer housing 21 during connection and disconnection of the couplings. The cooperation between the slidable inner housing 31 and the outer housing 20 is explained in detail in U.S. Pat. No. 4,444,223 and need not be repeated herein.

The slidable inner housing 31 includes a valve seat 44, and a generally tubular valve 45 is slidably mounted within the inner housings 31 and 34. A valve-support sleeve 46 is attached to the rear end of the housing 34. The valve 45 slides within a forward portion 47 of the sleeve 46, and a spring-retaining sleeve 48 which is attached to the valve 45 slides within a reduced-diameter portion 49 of the sleeve 46. An O-ring 50 (FIG. 3) is mounted on the valve 45 and is engageable with the valve seat 44, and a gasket 51 is mounted in an annular recess in the sleeve 46 and is sealingly engageable with the valve 45.

Referring to FIG. 4, a generally tubular actuator 53 is slidably mounted within the valve 45 and the spring-retaining sleeve 48. The actuator 53 includes a forward portion 54 which extends forwardly through an opening in the valve 45, a radially outwardly extending shoulder portion 55 which is engageable with the valve 45, and a rear portion 56. A coil spring 57 engages the shoulder 55 of the actuator and the radially inwardly extending rear end of the spring-retaining sleeve 48 and biases the actuator forwardly or to the left in the drawings.

The rear end portion 56 of the actuator slides over a tubular sleeve 59 which is connected to the inner housing 34 (see also FIG. 5). A locking pin 60 is slidably mounted within the sleeve 59 and is biased forwardly by a spring 61 which engages a shoulder 62 on the pin. A gasket 63 provides a hydraulic seal between the locking pin and the sleeve 59.

A plurality of locking balls 64 are mounted within openings in the sleeve 59. A ball-retainer sleeve 69 surrounds the locking balls so that the balls are retained within the sleeve. The locking pin 60 has a recess or groove 65, a radially outwardly extending shoulder or projection 66 forwardly of the recess 65, and a radially outwardly extending shoulder or projection 67 rearwardly of the recess 65. In FIG. 1 the shoulder 67 is held against a stop 68 (FIG. 5) on the sleeve 59 by the spring 61. The recess 65 is aligned with the locking ball 64, and the locking balls can move radially inwardly so that the outside of each ball is flush with the outside of the sleeve 59. In FIG. 5 the shoulder 66 is aligned with the locking ball 64 so that the balls are forced outwardly behind the rear end of the actuator 53. A ball-retainer sleeve 69 is mounted on the sleeve 59 to ensure that the locking balls do not escape from the openings in the sleeve 59.

A pair of coil springs 70 and 71 (FIG. 4) are mounted within the actuator 53. The outer spring 70 engages an internal shoulder on the actuator and the forward end of the sleeve 59. The inner spring 71 engages the forward end of the actuator 53 and an internal shoulder on the sleeve 59.

The forward end of the actuator 53 has an opening 72 which communicates with the internal bore of the inner slidable housing 31. The rear end of the inner housing 34 has an opening 73 which communicates the rear end of the locking pin 60 with atmospheric pressure through the tubes 27.

OPERATION

FIG. 1 shows the male coupling 10 and the female coupling 11 unconnected. The male coupling is connected by a hose (not shown) to a hydraulic tool such as an agricultural implement, and the female coupling is connected by a hose or conduit to a source of pressurized hydraulic fluid such as an agricultural tractor. The following description will assume that both couplings contain trapped pressurized hydraulic fluid from a previous connection which maintains the valves 14 and 45 against their seats.

FIG. 2 illustrates the couplings after they have been connected as described in U.S. Pat. No. 4,444,223. Both of the valves 14 and 45 are still retained against their seats by internal fluid pressure. The actuator 53 has been moved to the right by the ball valve 14 to permit the couplings to be connected. The actuator 53 retracts against the bias of the springs 70 and 71 inside of the actuator and the spring 57 outside of the actuator. However, the spring forces are not enough to unseat the ball valve 14 against the internal pressure in the male coupling and the closing force of the spring 16.

Figure 3:
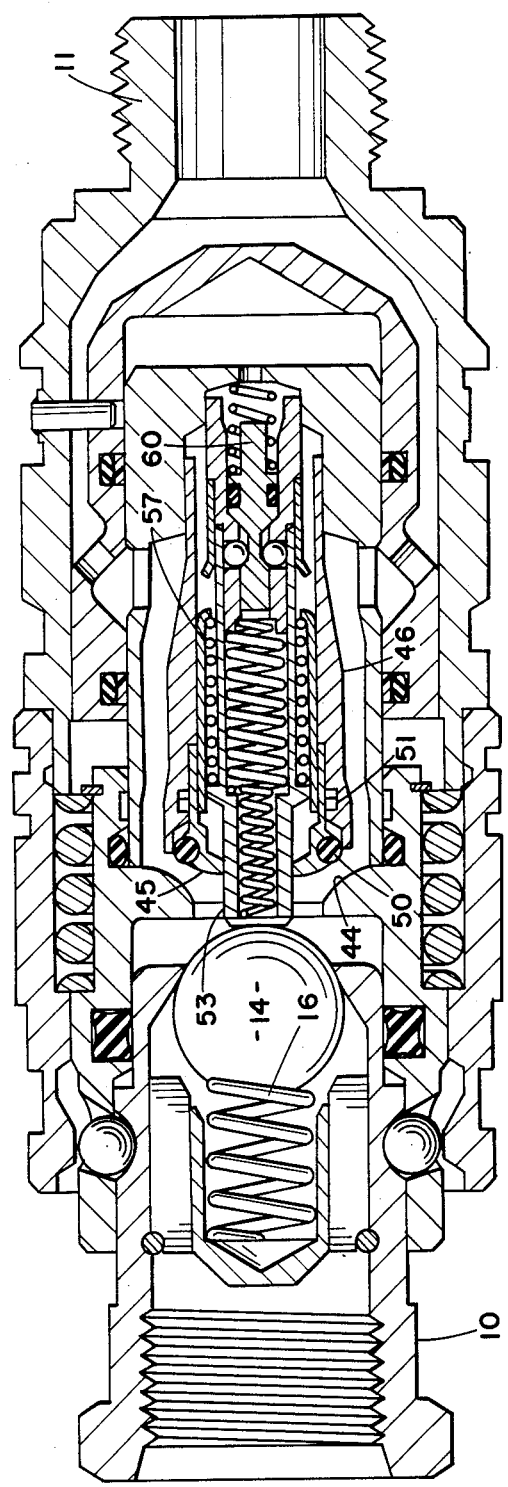
FIG. 3 illustrates the male and female couplings after the pressure in the female coupling has been relieved to open the valve in the female coupling.

FIG. 3 illustrates the couplings after the hydraulic pressure within the female coupling 11 has been dumped by shifting a control valve on the tractor. The spring 57 which surrounds the actuator 53 moves the valve 54 to the right away from the valve seat 44.

The operator then repressurizes the female coupling with high pressure hydraulic fluid by shifting the control valve on the tractor. The high pressure hydraulic fluid forces the ball valve 14 open as shown in FIG. 4. The actuator 53 follows the ball valve to the left under the influence of the springs 70 and 71. Both the female and male valves are now open, and hydraulic fluid can flow through the couplings.

The foregoing operation is typical of prior art couplings of the type described in U.S. Pat. Nos. 4,221,235 and 4,444,223. It is in the open position illustrated in FIG. 4 that such prior art couplings can experience valve shift (left-to-right in FIG. 4) under high surge flow conditions in the male-to-female direction. Such a surge can cause the male valve 14 to close and shut off fluid flow. In accordance with the invention the locking pin 60 locks the male valve in the open position and prevents left-to-right shift.

Referring to FIG. 2, when the male and female couplings are connected, the locking pin 60 is maintained in its unlocking position by the spring 61. The locking balls 64 are recessed into the groove in the locking pin, and the actuator 53 can move to the right over the locking balls.

Referring to FIG. 4, when the couplings are pressurized with high pressure hydraulic fluid, the fluid pressure acts against the locking pin 60 through the open forward end of the actuator 53 and forces the locking pin to the right against the bias of the spring 61. The rear end of the locking pin 60 is at atmospheric pressure by virtue of the opening 73 in the housing 34 and the tubes 27.

When the locking pin shifts to the locking position illustrated in FIGS. 4 and 5, the shoulder 66 forces the locking balls outwardly behind the rear end of the actuator. The locking balls thereby prevent the actuator 53 from shifting to the right, and the actuator maintains the ball valve 14 in the open position.

When the couplings are disconnected, the pressure within the actuator is released, and the locking pin is shifted to the unlocking position by the spring 61.

The foregoing description assumed that the couplings contained trapped fluid pressure before they were connected. However, the locking pin will operate in the same way if the couplings are not pressurized. When the couplings are connected and pressurized by the tractor as shown in FIG. 4, the fluid pressure will shift the locking pin to the right and move the locking balls to their locking position.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A quick disconnect female coupling for coaction with a check-valve equipped male coupling, the female coupling comprising:
   a generally tubular housing having an open forward end and an axially extending bore for receipt of said male coupling in said forward end and a valve seat,
   a valve slidably mounted within the bore of the housing and movable between a closed position in which the valve engages the valve seat and an open position in which the valve is spaced rearwardly from the valve seat,
   an actuator slidably mounted within the valve and having a forward end projecting forwardly beyond the valve, the forward end of the actuator being engageable with the check valve of the male coupling when the female coupling and the male coupling are connected, the actuator being movable to a forward position when the check valve is open,
   pressure activated lock means within said housing using only one set of locking balls engageable with the actuator when the actuator is in the forward position for maintaining the actuator in the forward position, the lock means being movable between a locking position and an unlocking position in response to pressure in the system, and means for moving the lock means into the locking position when the actuator is in the forward position.

2. The coupling of claim 1 in which the lock means comprises a plurality of locking balls.

3. A quick disconnect female coupling for coaction with a check-valve equipped male coupling, the female coupling comprising:

a generally tubular housing having an open forward end and an axially extending bore for receipt of said male coupling in said forward end and a valve seat, a valve slidably mounted within the bore of the housing and movable between a closed position in which the valve engages the valve seat and an open position in which the valve is spaced rearwardly from the valve seat, an actuator slidably mounted within the valve and having a forward end projecting forwardly beyond the valve, the forward end of the actuator being engageable with the check valve of the male coupling when the female coupling and the male coupling are connected, an actuator being movable to a forward position when the check valve is open, lock means within said housing engageable with the actuator when the actuator is in the forward position for maintaining the actuator in the forward position, the lock means having a plurality of locking balls and being movable between a locking position and an unlocking position, and means for moving the lock means into the locking position when the actuator is in the forward position comprising a pin slidably mounted within the housing, the pin having a recess for receiving the locking balls when the locking balls are in the unlocking position and a radially outwardly extending projection for moving the locking balls outwardly to their locking position.

4. The coupling of claim 3 in which the pin is slidable between a locking position and an unlocking position, the housing having a fluid flow path therein, the pin communicating with the fluid flow path whereby the pin can be biased by fluid pressure in the fluid flow path toward the locking position.

5. A quick disconnect female coupling for coaction with a check-valve equipped male coupling, the female coupling comprising:

a generally tubular housing having a tubular sleeve mounted within the housing and having an open forward end and an axially extending bore for receipt of said male coupling in said forward end and a valve seat, a valve slidably mounted within the bore of the housing and movable between a closed position in which the valve engages the valve seat and an open position in which the valve is spaced rearwardly from the valve seat, an actuator slidably mounted within the valve and having forward end projecting forwardly beyond the valve, the forward end of the actuator being engageable with the check valve of the male coupling when the female coupling and the male coupling are connected, the actuator being movable to a forward position when the check valve is open, lock means within said housing engageable with the actuator when the actuator is in the forward position for maintaining the actuator in the forward position, the lock means having a plurality of locking balls mounted in openings in the sleeve and being movable between a locking position and an unlocking position, and means for moving the lock means into the locking position when the actuator is in the forward position comprising a pin slidably mounted within the sleeve, the pin having a recess and a radially outwardly extending projection adjacent the recess, the pin being movable between a locking position in which the radial projection on the pin forces the locking balls radially outwardly to their locking position and an unlocking position in which the balls are aligned with the recess and can move inwardly to their unlocking position.

6. The coupling of claim 5 in which the actuator includes a rear end which is engageable with the locking balls when the actuator is in the actuating position and the locking balls are in the locking position.

7. The coupling of claim 5 including a spring for biasing the pin to its unlocking position.

8. The coupling of claim 5 in which the housing has a fluid flow path therein and the forward end of the sleeve communicates with the fluid flow path whereby the pin can be biased by fluid pressure in the fluid flow path toward its locking position.

9. The coupling of claim 8 in which the housing include means for communicating the rear end of the sleeve with atmospheric pressure.

* * * * *